US005501258A

United States Patent [19]
Sulkowski

[11] Patent Number: 5,501,258
[45] Date of Patent: Mar. 26, 1996

[54] TIRE TREAD HAVING A CIRCUMFERENTIAL GROOVE DEEPER THAN TREAD ELEMENT HEIGHT

[75] Inventor: David J. Sulkowski, Guilford, Conn.

[73] Assignee: Pirelli Armstrong Tire Corporation, New Haven, Conn.

[21] Appl. No.: 267,034

[22] Filed: Jun. 27, 1994

[51] Int. Cl.$^6$ .......................... B60C 11/117; B60C 11/03
[52] U.S. Cl. .......................................... 152/209 R
[58] Field of Search ........................ 152/209 R, 454

[56] References Cited

U.S. PATENT DOCUMENTS

| | | | |
|---|---|---|---|
| D. 261,494 | 10/1981 | Suzuki et al. | D12/146 |
| D. 263,946 | 4/1982 | Kojima et al. | D12/146 |
| D. 280,090 | 8/1985 | Graas | D14/146 |
| D. 294,239 | 2/1988 | Graas | D12/146 |
| D. 298,115 | 10/1988 | Kuroda | D12/146 |
| D. 311,888 | 11/1990 | Guermandi et al. | D12/146 |
| D. 311,889 | 11/1990 | Guermandi et al. | D12/146 |
| D. 317,740 | 6/1991 | Takehara | D12/146 |
| D. 322,236 | 12/1991 | Maxwell et al. | D12/141 |
| 1,203,915 | 11/1916 | Schmitt | 152/209 R |
| 1,877,988 | 9/1932 | Schrank | 152/209 R |
| 1,922,291 | 8/1933 | Hargraes | 152/209 R |
| 2,048,635 | 7/1936 | Kraft | 152/209 R |
| 2,155,972 | 4/1939 | Hower | 152/209 R |
| 2,197,662 | 4/1940 | Hughes | 152/209 R |
| 2,605,807 | 8/1952 | Wittmer | 152/209 R |
| 3,254,693 | 6/1966 | Travers | 152/209 R |
| 3,789,898 | 2/1974 | Montagne | 152/209 R |
| 3,830,273 | 8/1974 | Boileau | 152/209 WT |
| 4,278,121 | 7/1981 | McDonald | 152/209 R |
| 4,289,182 | 9/1981 | Sato et al. | 152/209 R |
| 4,351,381 | 9/1982 | Roberts et al. | 152/209 R |
| 4,700,762 | 10/1987 | Landers | 152/209 R |
| 4,785,863 | 11/1988 | Tsuda et al. | 152/209 A |
| 4,796,683 | 1/1989 | Kawabata et al. | 152/209 R |
| 4,913,208 | 4/1990 | Anderson et al. | 152/209 R |
| 5,147,478 | 9/1992 | Nock et al. | 152/209 R |
| 5,176,766 | 1/1993 | Landers et al. | 152/209 R |
| 5,188,684 | 2/1993 | Himuro | 152/209 R |
| 5,200,008 | 4/1993 | Enterline et al. | 152/209 R X |
| 5,240,053 | 8/1993 | Baumhoefer et al. | 152/209 R |

FOREIGN PATENT DOCUMENTS

| | | |
|---|---|---|
| 0503407 | 2/1992 | European Pat. Off. . |
| 0503404 | 2/1992 | European Pat. Off. . |
| 0503405 | 2/1992 | European Pat. Off. . |
| 0503406 | 2/1992 | European Pat. Off. . |
| 64503 | 8/1986 | Japan ............... B60C 11/00 |

Primary Examiner—Michael W. Ball
Assistant Examiner—Francis Lorin
Attorney, Agent, or Firm—St. Onge Steward Johnston & Reens

[57] ABSTRACT

A tire is provided including a subtread, a plurality of tread elements extending a height "H", and a circumferential groove in the tread having a depth greater than tread element height "H" and extending into the subtread of the tire. Most preferably the groove is bounded by continuous circumferential ribs which close the groove to prevent drainage of fluid to the tread edge and reduce the amount of noise generated by the tread. The ribs also radially reinforce the tread in the region of the groove and aid in providing the tread with a uniform road engaging surface for maximum wear life. Preferably, the tire includes a belt package for reinforcing substantially the entire width of the tread.

11 Claims, 9 Drawing Sheets

FIG. 4

| | WET LATERAL TRACTION | WET CONTROLABILITY | WET GRIP INITIAL | WET GRIP FINAL | TOTAL WET HANDLING |
|---|---|---|---|---|---|
| COMPETITOR #1 | 3 | 4.0 | 3 | 3 | 13 |
| COMPETITOR #2 | 4.5 | 5.5 | 5.0 | 3 | 18 |
| AQUAMILE (P400) | 5.5 | 5.5 | 5.5 | 5.5 | 22 |

TIRE TREAD HAVING A CIRCUMFERENTIAL GROOVE DEEPER THAN TREAD ELEMENT HEIGHT

FIELD OF THE INVENTION

The invention relates to tire treads having deep circumferential grooves for improved wet traction. More specifically, the invention relates to nondirectional tire treads with deep circumferential grooves reinforced by circumferential tread rubber ribs.

BACKGROUND OF THE INVENTION

Tires having treads with central circumferential grooves for improved wet traction are very well known in the prior art. Goodyear's AQUATREAD tire is one such prior art tire, and is the subject of the following patents and patent applications: U.S. Pat. Nos. 4,700,762 and 5,176,766, and European Patent Publication Nos. 503 404 A1, 503 405 A1, 503 406 A1 and 503 407 A1. The AQUATREAD tire and corresponding prior art publications all appear to disclose a tread including a "depression" or "aqua channel" at the mid-circumferential centerplane of the tire and a plurality of unblocked lateral grooves which merge with the depression to channel water to the tread edge when the tire is rotated in the sole, proper direction.

The '762 and '766 patents, and the '404 and '407 publications generally disclose the depression or aqua channel as having a depth of about 78–100% of tread depth. One disadvantage of the AQUATREAD tire is that the aqua channel may have diminished effectiveness as the tread wears and indeed may be detrimental to wet traction since channel depth may be exhausted with 22% of tread depth remaining on the tire. Another disadvantage is that because the AQUATREAD tire is designed for unidirectional rotation, it may not be effectively used on both sides of a vehicle without being removed from and remounted on the wheel or hub.

U.S. Pat. No. 3,830,273 discloses a broad central, circumferential groove to improve wet traction for very wide tread (large contact area) tires conventionally used to improve curve holding and dry traction on very fast vehicles. The broad central, circumferential groove essentially permits a single tire to replace twin tires. The groove disadvantageously requires a completely reengineered carcass which includes a wire reinforcing rod of diameter intermediate between the bead diameter and the tread diameter. Another disadvantage is the further complexity and expense of providing independent tread reinforcements for each of the tread portions.

In U.S. Pat. No. 3,789,898, central groove 15 includes a cut 16 to provide an articulation joint to the tire tread, so that the tire, preferably a truck or bus tire, moves more easily over any difference in level between the road and shoulder. The articulation joint reduces the need to move the whole tread to a single surface for vehicle control and to reduce swerving. Cut 16 has negligible width and apparently would not be effective to improve wet traction. A further disadvantage is that the provision of separate belt plies on either side of cut 16 increases the complexity and cost of manufacturing the tire.

U.S. Pat. Nos. 4,289,182 4,785,863 and 4,796,683 all appear to disclose circumferential tread rubber ribs, however, these ribs do not reinforce central circumferential grooves deeper than tread element height and do not urge water into the subtread portion of the central groove. In the '863 patent, the ribs separate portions of the tread designed for wet and dry traction.

What is desired, therefore, is a tire having a tread which provides improved wet traction throughout tread element wear without necessitating either a supplemental reinforcing wire, a distorted carcass, or a dual reinforcing belt system. A tire having improved wet traction when the tread rubber is worn completely off is also desired.

SUMMARY OF THE INVENTION

Accordingly, it is an object of the invention to provide a tire having a nondirectional tread with a circumferential groove for improving wet traction without requiring a nonstandard carcass, a supplemental reinforcing wire, or a dual reinforcing belt package.

Shown in FIG. 4 in tabular format are the results of wet handling testing conducted on a flooded track (road surface), evaluating wet tractive performance of the object of the invention versus an Aqua Concept Competitor and an 80,000 mile Concept Competitor.

Results when indexed for comparison of the total wet handling performance (see FIG. 5), indicate the object of invention (AQUAMILE P400), to offer superior wet traction performance over either of the two competitor's in a new tire state. This substantial increase in wet traction capability is achieved through the object of the invention without requiring a supplemental wire or nonstandard tire carcass to be utilized.

An additional measure of tire wet tractive capability is its wet braking distance test result. As indicated in FIG. 9, wet braking testing was conducted on a flooded surface at two different speeds with a vehicle having ABS. Results show the object of the invention (P400 Aquamile), to stop substantially faster than either competitor #1 or competitor #2. At 50 mph the object of the invention stops 18.9 feet less than competitor #1 and 4.6 feet less than competitor #2. This quicker stopping of the vehicle offers the consumer enhanced wet braking performance to avoid vehicular contact. The object of the invention thus offers the consumer superior wet braking performance over either of the two competitors.

Another object of the invention is to provide a tire of the above character in which the circumferential groove is deeper than tread element height to maintain improved traction throughout tread element wear.

As shown in FIG. 6, the object of the invention (Aquamile P400), utilizing a circumferential groove deeper than the element height was tested at new tire depth, at 33% worn depth, at 67% depth and at wearout—100% worn. It was tested against an Aqua Concept competitor and an 80,000 mile Concept tire.

The results shown in FIG. 6 confirm that the current available Aqua Concept tire referenced as competitor #2 loses hydroplaning capability (that is from initial onset to full hydroplaning) as the tire wears from new to 100% worn. This is due to the fact that at wearout competitor #2 has no design left to contribute to hydroplaning performance because it is above the subtread.

Whereas the object of the invention, as shown in FIG. 6 actually increases in hydroplaning range as the tire wears. This range is critical to the consumer because the onset of full hydroplaning is prolonged, thus preventing loss of vehicle control.

Yet another object of the invention is to provide a tire of the above character in which the circumferential groove extends into the tire subtread, to obtain a tire which will have a wear life of greater than 80,000 miles.

Long term fleet wear testing was conducted on the object of the invention versus an Aqua Concept tire and an 80,000 mile Concept tire. Results shown in FIG. 7 are of the fastest wearing groove location of the tread surface. Test results were run over 50,000 miles to obtain a high degree of statistical accuracy. Results indicate the object of the invention to wear 38% longer than competitor #2 with competitor #1 and the object of the invention surpassing the required design target for mileage warranty.

A further object of the invention is to provide a tire of the above character in which inward walls of the ribs slope inwardly toward the mid-circumferential centerplane and the subtread of the tire to urge water beneath the tread up into the portion of the circumferential groove which is deeper than tread element height and/or extends into the tire subtread.

Still another object of the invention is to provide a tire of the above character in which the circumferential groove is reinforced by circumferential rubber ribs.

Yet a further object of the invention is to provide a tire of the above character in which the ribs have a diameter substantially equal to the tread diameter.

These and other objects of the invention are achieved by provision of a tire including a subtread, a tread extending around the subtread and comprising a plurality of tread elements extending a height from the subtread, and a circumferential groove in the tread having a depth greater than tread element height and/or extending into the subtread of the tire.

The groove is preferably centrally located at a mid-circumferential centerplane of the tire. Most preferably the groove is bounded by continuous circumferential ribs of tread rubber which close the groove to prevent drainage of fluid in the groove to the tread edge and also to reduce the amount of noise generated by the tread. The ribs also radially reinforce the tread in the region of the groove and aid in providing the tread with a uniform road engaging surface. The ribs preferably have a diameter substantially equal to the tread diameter.

The tire preferably includes second circumferential grooves in the tread on either side of the first groove. The second grooves are preferably interconnected with a plurality of lateral grooves for draining fluid beneath the tire to the tread edge. Most preferably, the lateral grooves are blocked to reduce noise generated by the tire while permitting fluid passage to the tread edge. As shown in FIG. 2, the object of the invention utilizes blocking of lateral groove, located on another side of second circuit. Grooves as well as a closed center circumference groove which results in a substantially quieter tire as exhibited in FIG. 8. The object of the invention was tested on a Mercedes 280 S.E. and exterior noise measurements were taken. The object of the invention was tested against competitor #1 as reference. Results indicate a reduced noise level of 6–7% over the various speeds tested for the object of the invention versus the competitor.

Preferably, the tire includes a belt package for reinforcing substantially the entire width of the tread.

The invention and its particular features and advantages will become more apparent from the following detailed description considered with reference to the accompanying drawings.

BRIEF DESCRIPTION OF THE DRAWINGS

FIG. 4 is a table summarizing wet handling test results.

DETAILED DESCRIPTION OF THE INVENTION

Figure 1:
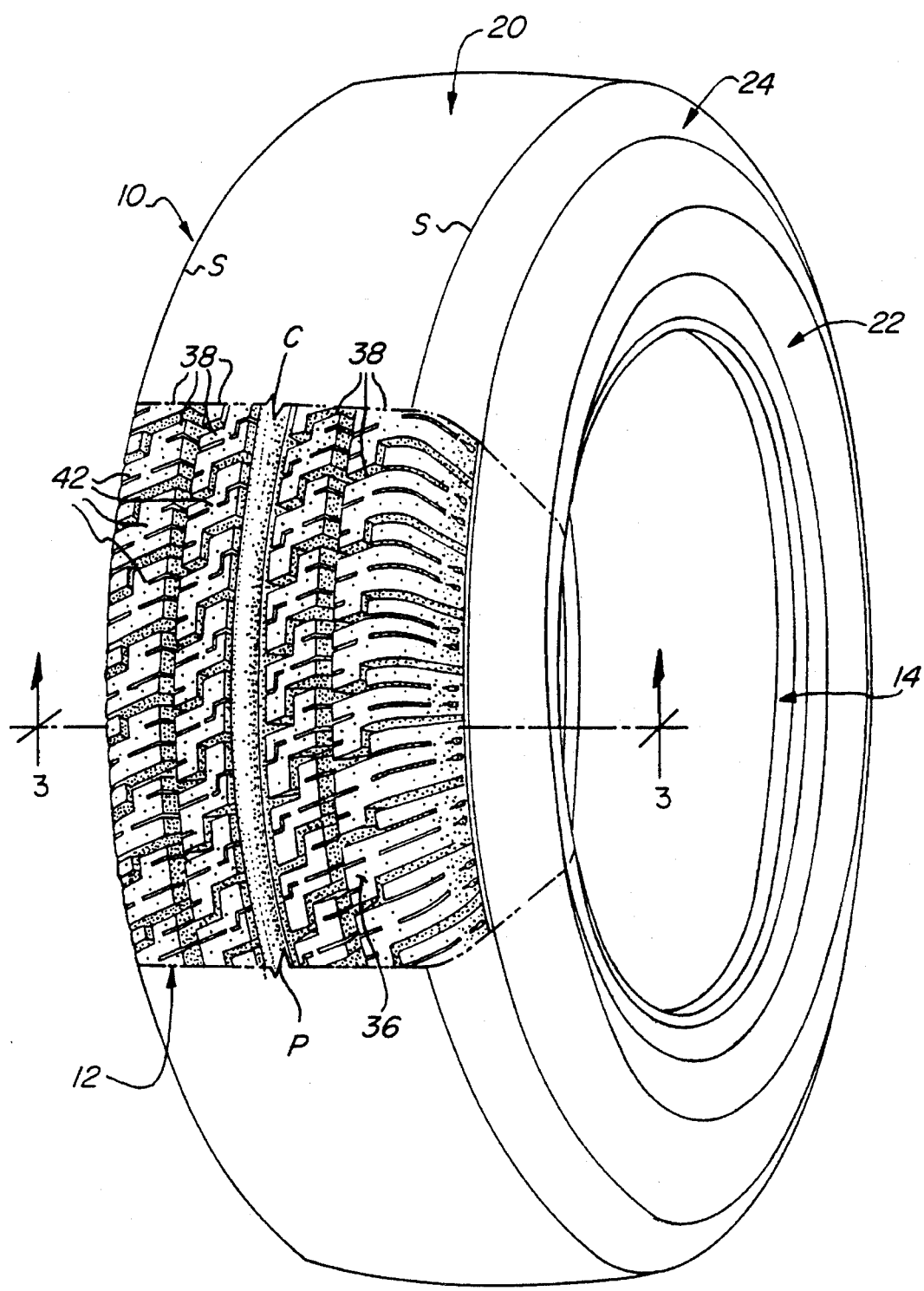
FIG. 1 is an isometric view of a tire including a portion of a tread having a circumferential groove in accordance with the invention.
Figure 2:
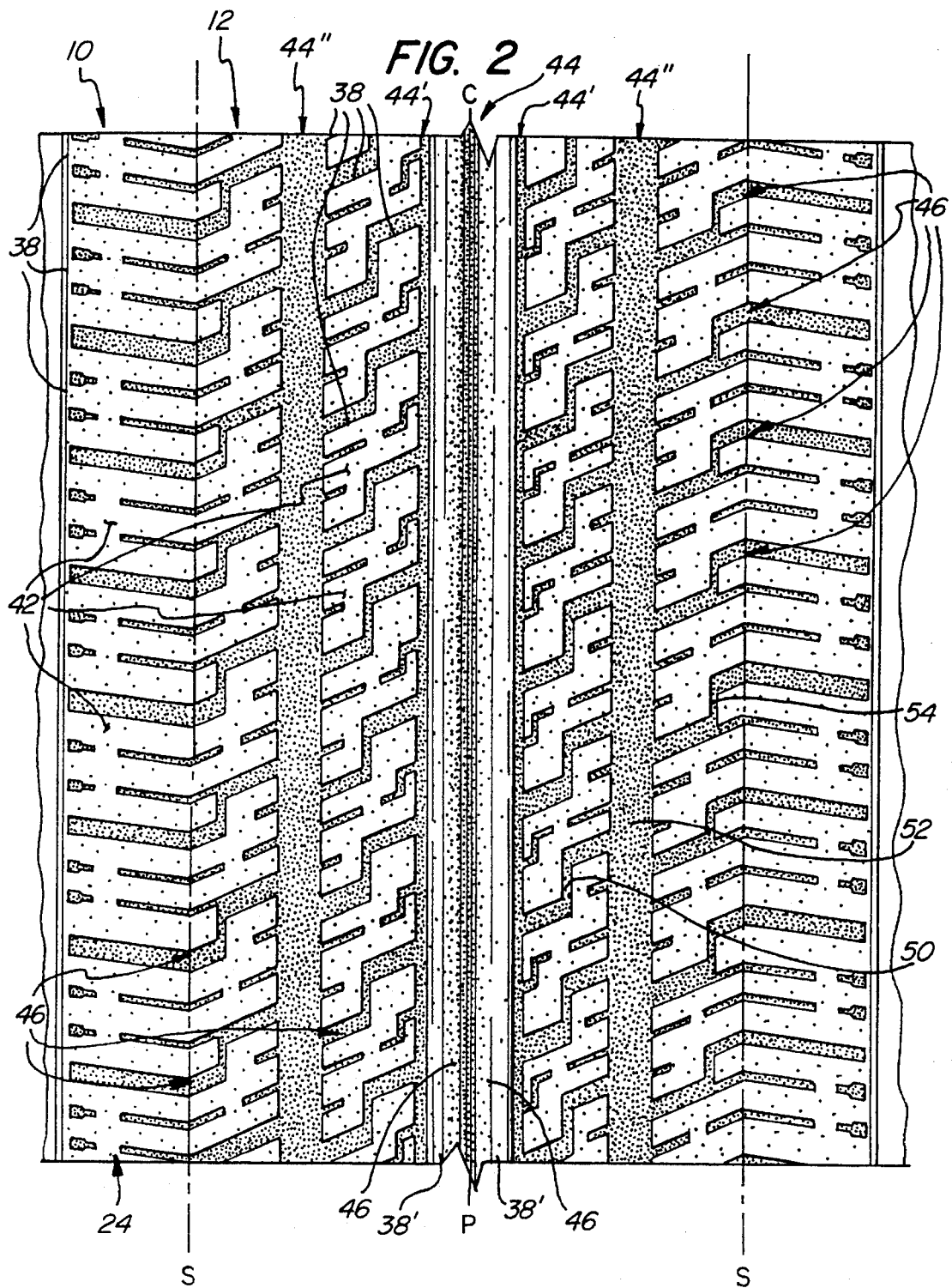
FIG. 2 is a plan view of the tire of FIG. 1 illustrating the tread pattern.

Referring to FIGS. 1, 2 and particularly 3, a pneumatic tire 10 having a tread 12 in accordance with the invention is depicted in various views. Tire 10 comprises a pair of beads 14 reinforced by bead wires 16, a carcass 18 extending in an arc between beads 14, and tread 12 extending around tire 10 at the crown portion 20 of carcass 18.

Sidewalls 22 comprise the portions of carcass 18 between beads 14 and crown 20. Sidewalls 22 and crown portion 20 of tire 10 meet in shoulder portions 24. Carcass 18 is formed of subtread rubber 26, and includes a carcass ply 28 and a tread reinforcing belt package 30 located between carcass ply 28 and tread 12 completely around crown portion 20 of carcass 18 between shoulders 24.

Belt package 30 is illustrated as a plurality of tapered, stacked plies 32 topped a cap ply 34, however, it is understood that a "belt package" may comprise one or more plies having the same or differing widths, being folded or woven, and/or being closely stacked or radially spaced apart. Further, it is understood that the plies in a "belt package" may be calendared with subtread rubber 26, or may be set in thermoplastic or thermosetting resin, and that the plies may include cords formed of steel, glass, Kevlar, Spectra or other suitable, relatively high modulus material.

Its particular construction is not critical, however, each ply of belt package 30 reinforces substantially the entire lateral width W of tread 12 in order that tread 12 may provide a road engaging surface 36 substantially uniform through its width W. In the case of folded plies or the like, it is understood that they reinforce substantially the entire lateral width W of tread 12 so long as at least a portion of each ply reinforces substantially the entire lateral width. By "reinforcing substantially the entire lateral width" is meant that a single belt package or ply portion reinforces tread 10 and that two or more belt packages or ply portions need not be used to reinforce the tread which due to a particular tire's construction is split or otherwise may not provide a road engaging surface uniform through its width.

Tread 12 comprises a plurality of spaced-apart elements 38, 38' of tread rubber 40. Tread 12 has an overall net to gross ratio of about 72%. Each tread element 38, 38' includes an upper face 42, spaced apart from subtread 26 by a tread element height H, and forming a portion of road engaging surface 36. Tread rubber 40 may have the same composition, but preferably has a different composition than subtread rubber 26. In this regard, the composition of tread rubber 40 may for example include additives designed to improve traction, wear, or the like. Tread elements 38, 38' are spaced apart by five circumferential grooves 44, 44' and 44" forming six individual contact patches, and by a plurality of lateral grooves 46. Each of circumferential grooves 44, 44' and 44" has a uniform width in a direction around the circumference of tire 10 preferably less than about 10%, but more than 5% of overall tread contact width under normal operating conditions. Grooves 44' and 44" also have substantially uniform widths in a direction toward subtread 18 of tire 10.

Circumferential grooves 44" have a depth equal to tread element height H. Thus, as tread elements 38, 38' wear, circumferential groove 44" maintains substantially constant width, and when tread elements 38, 38' are worn flat, circumferential grooves 44" have completely disappeared. Circumferential groove 44, however, has a depth D greater than tread element height H. Depth D is preferably equal to about 0.385 inches while height H is preferably equal to about 0.365 inches. However, depth D may extend to a depth of 9% more than height H or as little as 2% more than height H. Thus, when tread elements 38, 38' are worn flat, circumferential groove 44 continues to move fluid out from beneath the contact patch of tire 10.

Central groove 44 extends through tread rubber 40 and into subtread rubber 26 in order to provide drainage even when tread rubber 40 has completely worn off tire 10. Thus, circumferential groove 44 provides drainage throughout tread element wear, improving wet traction.

Tread elements 38' comprise circumferential ribs of tread rubber 40 having an outer diameter substantially equal to an outer diameter of tire 10 around faces 42 of the tread elements. Tread element ribs 38' are solid and have individual net-to-gross ratios of 100 percent. In this regard, tread element ribs 38' laterally close central groove 44 to prevent drainage of fluid in central groove 44 to the lateral tread edge S, and to reduce the amount of noise generated by the tread on a road. Ribs 38' also prevent radial expansion of tire 10 in the region of central groove 44 to reinforce tread 12 and to aid in providing the tread with a uniform road-engaging surface without necessitating redesign of subtread 18, or dual belt packages, or a wire reinforcement of diameter between the bead and belt diameters. By "dual belt package" is meant a belt package in which one or more plies is divided into two or more pieces, each of which reinforces only a portion of the tire tread. Reduction of radial expansion and tread reinforcement is also aided by providing circumferential grooves 44' adjacent ribs 38' with depths equal to only about ½ of tread element height H.

Figure 3:
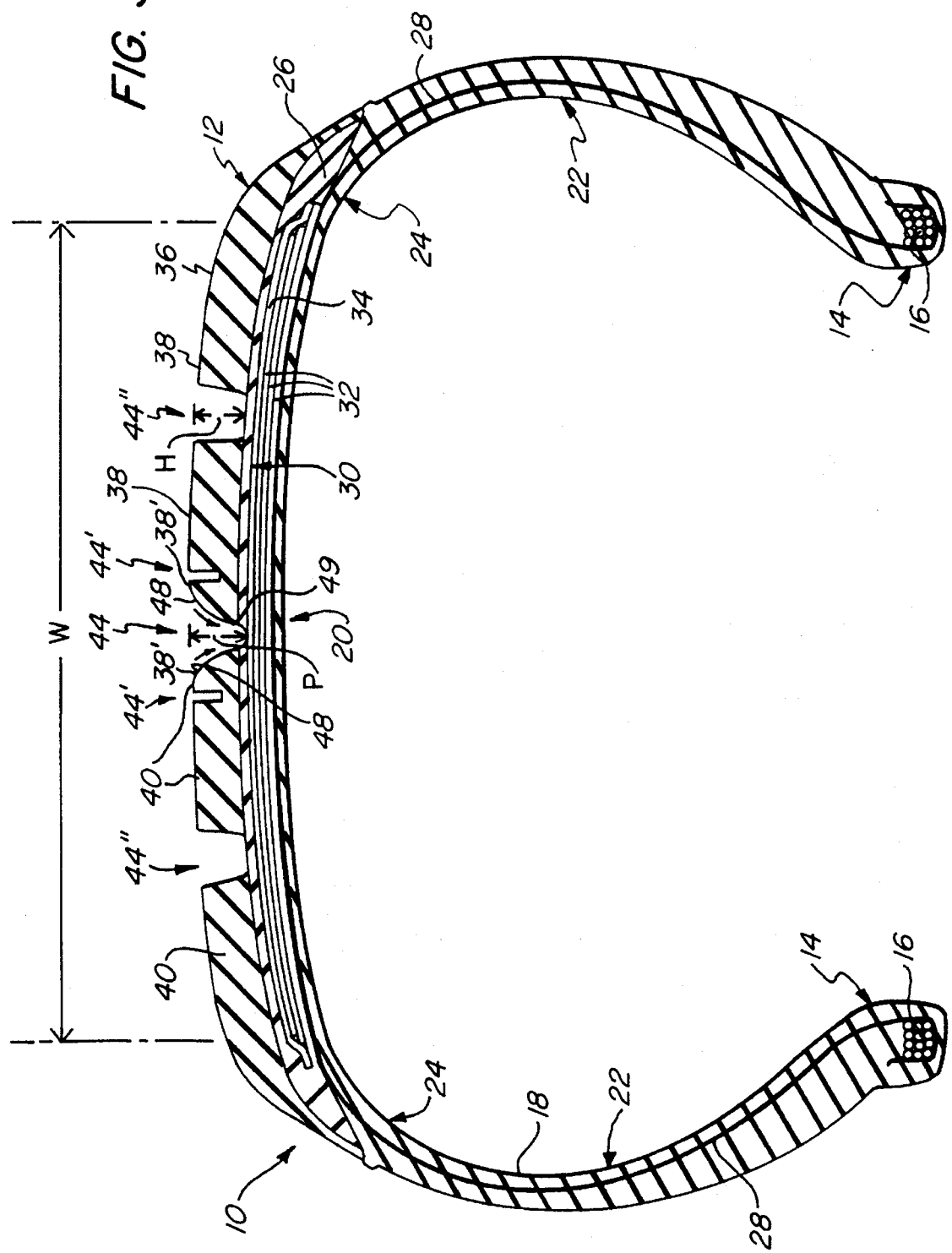
FIG. 3 is a cross sectional view of the tire of FIG. 1 illustrating the groove and rib geometry.
Figure 5:
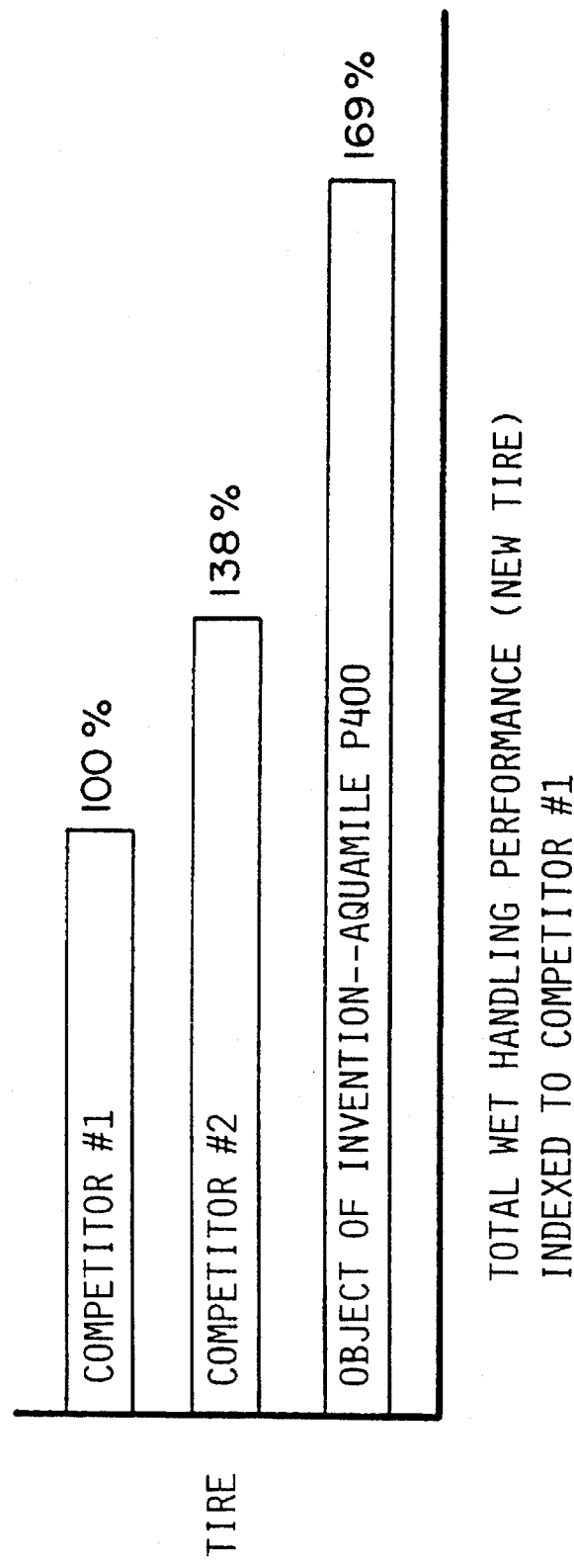
FIG. 5 is a bar graph depicting wet handling performance.
Figure 6:
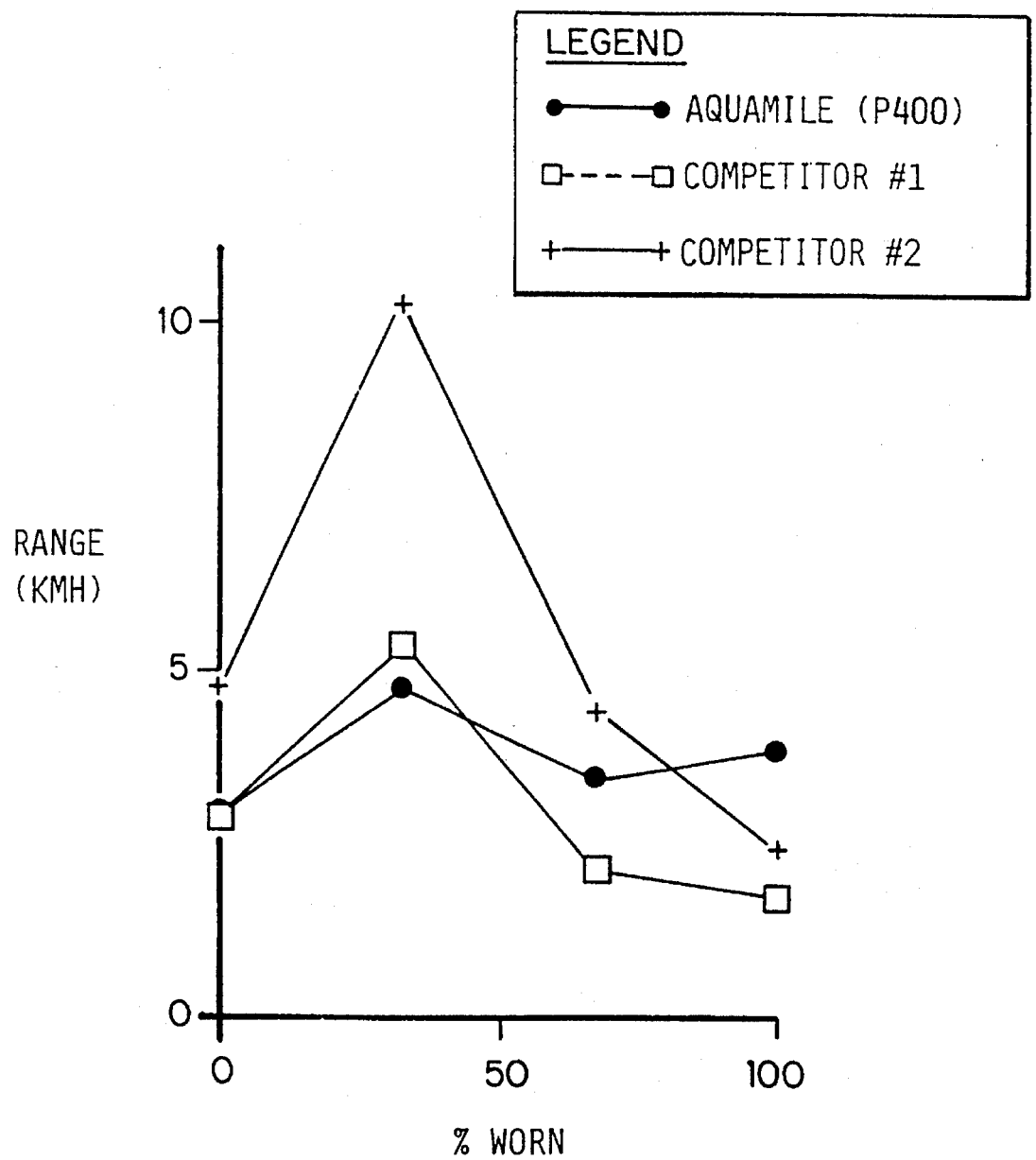
FIG. 6 is a graph summarizing hydroplaning test results.
Figure 7:
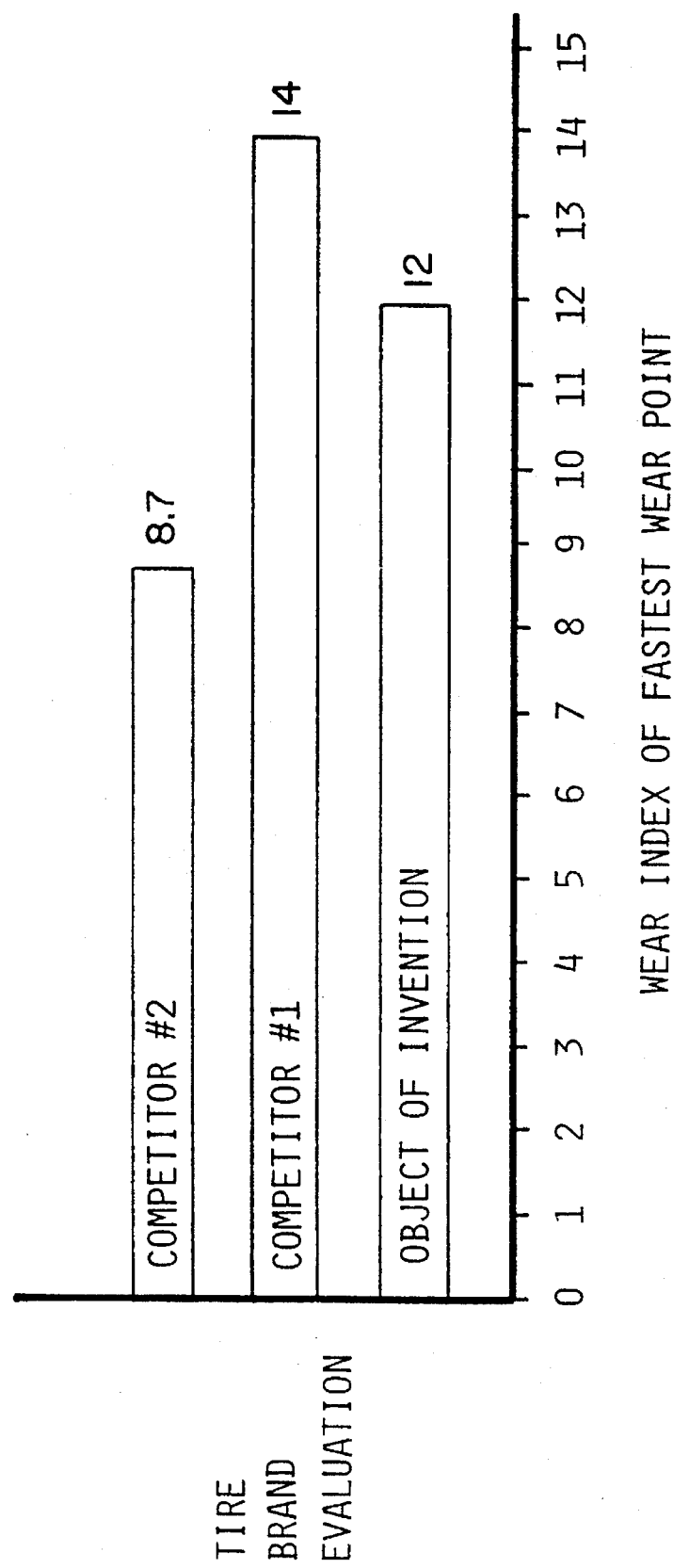
FIG. 7 is a bar graph depicting wear test results.
Figure 8:
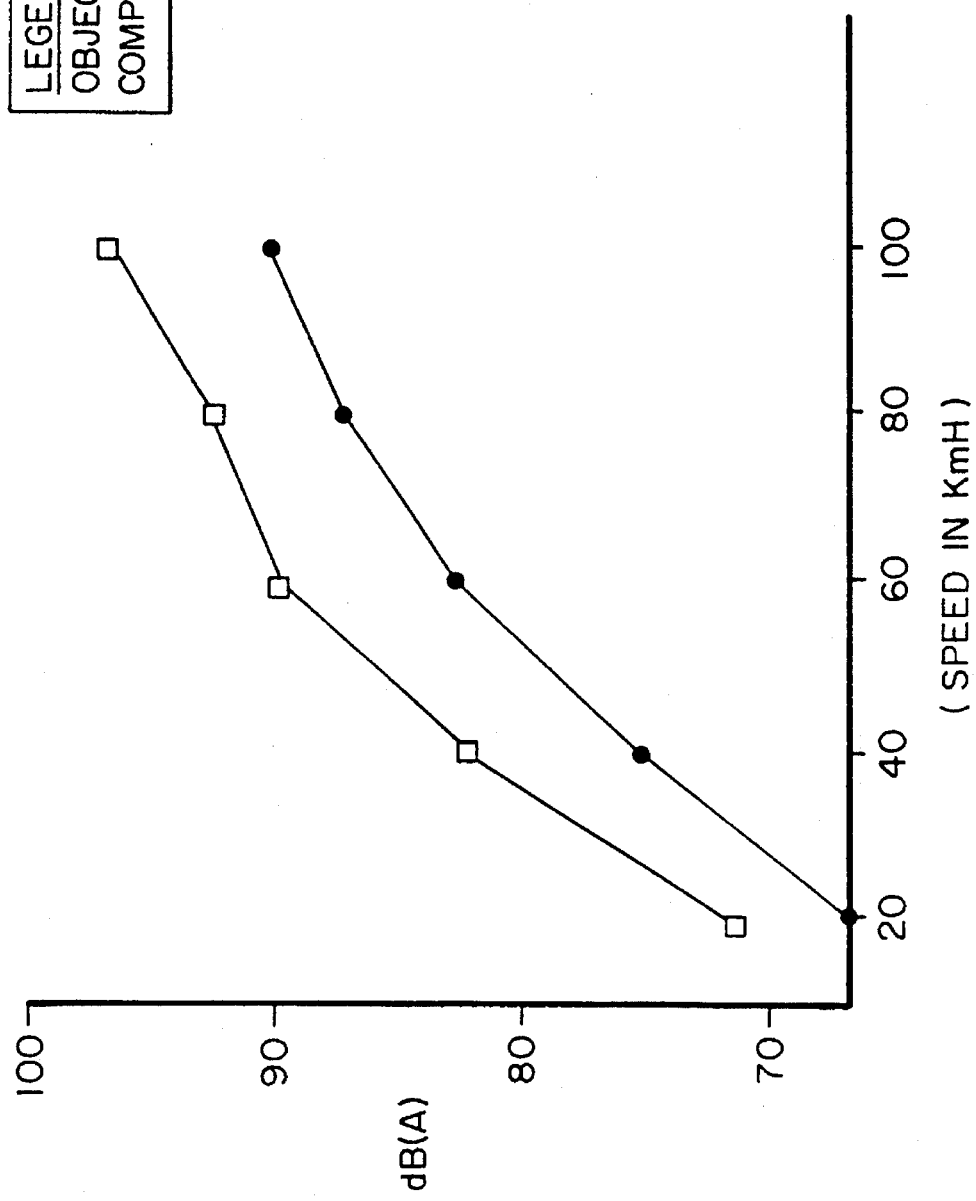
FIG. 8 is a graph summarizing external noise test results.
Figure 9:
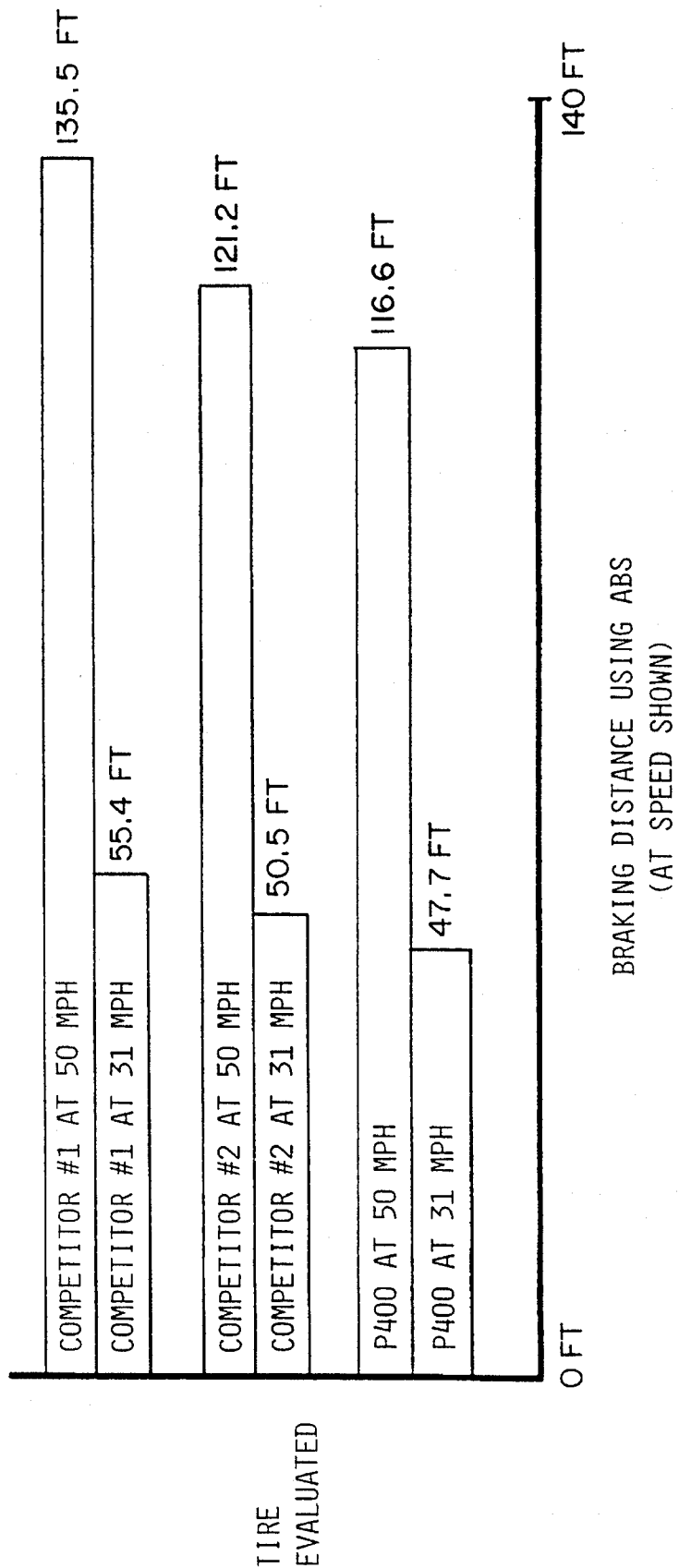
FIG. 9 is a graph depicting wet braking results.

Referring particularly to FIG. 3, tread element ribs 38' include walls 48 bordering central groove 44 and facing the other rib. Walls 48 slope toward the mid-circumferential centerplane CP of tire 10 and toward subtread 18 of tire 10. Thus, groove 44 does not have a substantially uniform width in a direction toward subtread 18 of tire 10, but instead gets progressively narrower as tread 12 wears. In operation of tire 10 over a fluid covered road surface, walls 48 urge fluid in the direction of the arrows in FIG. 3 toward the narrower portion 49 of central groove 44 and toward the subtread rubber portion 26 of central groove 44 to remove water from between road engaging surface 36 of tire 10 and the road (not shown) to improve wet traction. Since groove 44 is deeper than tread element height H, this traction-improving effect lasts throughout tread element wear. Further, since groove 44 extends through tread rubber 40 and into subtread rubber 26, the groove provides superior traction throughout tread wear and continues to provide improved traction when all tread rubber has worn off tire 10.

Referring particularly now to FIG. 2, lateral grooves 46 interconnect circumferential grooves 44' and 44"—but not closed groove 44—with the lateral edge of the tread contact patch of tire 10. The lateral edge of the tread contact patch is represented by shoulder S for normal, straight-line operation of tire 10. Lateral grooves 46 thus provide passageways for draining fluid beneath road engaging surface 36 to the lateral tread edges. In order to reduce the noise generated by tread elements 38 as tire 10 rolls over the road surface, lateral grooves 46 are blocked. By "blocked" is meant that lateral grooves 46 include three substantially circumferential portions 50, 52 and 54 between circumferential groove 44' and tread shoulder S. "Blocked" portion 52 comprises circumferential groove 44" and reflects the fact that the portion of lateral groove 46 between circumferential grooves 44' and 44" is not in direct lateral alignment with the portion of lateral groove 46 between circumferential grooves 44" and the tread shoulders.

Unlike many prior art tires which provide improved wet traction by "pumping" water from circumferential grooves (and especially open central grooves) to the tread edge through unblocked lateral grooves, tire 10 is a quieter tire through use of blocked lateral grooves, and it still provides excellent wet traction through the combination of blocked lateral grooves and a closed central groove 44 deeper than tread element height and extending into the subtread to maintain superior wet traction throughout tread wear. Further wear life is maximized through the use of a closed central groove deeper than tread element height having the maximum net to gross amount of 100 percent.

Although the invention has been described with reference to a particular arrangement of functions, features and the like, these are not intended to exhaust all possible advantages or features, and indeed many other modifications and variations will be ascertainable to those of skill in the art.

What is claimed is:

1. A nondirectional pneumatic tire having a carcass including a carcass ply arcing between two beads and a tread circumferentially extending around the carcass midway between the beads, the tire comprising:

a subtread formed of subtread rubber located in the carcass between the carcass ply and the tread;

a belt package located within said subtread and reinforcing the tread;

a plurality of road-contacting tread elements formed of tread rubber extending a height from the subtread;

a first circumferential groove located at a mid-circumferential centerplane of the tire, the central circumferential groove having a substantially constant width in a direction around the circumference of the tire; said width being between 10% and 5% of overall contact width under normal operating conditions, and having a depth D greater than the tread element height H throughout tread element wear down to said subtread, depth D initially being between 2% and 9% greater than initial tread element height H, and said circumferential groove extending into said subtread of the tire to maintain wet traction throughout tread element wear down to said subtread; and two continuous circumferential tread rubber ribs, one on either side of said central circumferential groove, the ribs having an outer diameter substantially equal to an outer diameter of the tread, the ribs radially reinforcing the tread and aiding to provide a substantially uniform road engaging surface to the tire.

2. The nondirectional pneumatic tire of claim 1 wherein inward walls of said ribs slope inwardly toward the midcircumferential centerplane and toward the subtread of the tire to urge fluid under the tread into the subtread portion of said central circumferential groove which extends beyond the tread element height.

3. The nondirectional pneumatic tire of claim 2 wherein said ribs are continuous around the circumference of the tire to close said central groove preventing fluid therein from draining to the tread edge and reducing the amount of noise generated by the tire.

4. The nondirectional pneumatic tire of claim 1 including a second circumferential groove in the tread on either side of said central circumferential groove between the ribs and an edge of the tread.

5. The nondirectional pneumatic tire of claim 4 including a plurality of lateral grooves interconnected with said second circumferential grooves on either side of said central groove to provide passageways for draining fluid under the tire to the tread edges.

6. The nondirectional pneumatic tire of claim 5 wherein said passage-ways include portions extending substantially circumferentially around the tire to reduce the amount of noise generated by contact between the tread elements and a road surface.

7. A nondirectional pneumatic tire comprising:

a carcass having a ply and a subtread formed from subtread rubber;

a plurality of road-contacting tread elements formed of tread rubber and extending from said subtread;

a first circumferential groove having a depth extending through the tread rubber and into the subtread rubber of the tire to maintain wet traction throughout tread element wear down to said subtread; and two continuous circumferential tread rubber ribs on either side of said first circumferential groove, the ribs having inward walls bounding said first groove which slope inwardly toward each other and toward said subtread to urge fluid under the tread into the subtread rubber portion of said first circumferential groove.

8. The nondirectional pneumatic tire of claim 7 wherein said ribs are continuous around the circumference of the tire to close said central groove preventing fluid therein from draining to the tread edge and reducing the amount of noise generated by the tire.

9. The nondirectional pneumatic tire of claim 7 including a second circumferential groove in the tread on either side of said first circumferential groove between the ribs and an edge of the tread.

10. The nondirectional pneumatic tire of claim 9 including a plurality of lateral grooves interconnected with said second circumferential grooves on either side of said first groove to provide passageways for draining fluid under the tire to the tread edges.

11. The nondirectional pneumatic tire of claim 10 wherein said passage-ways include portions extending substantially circumferentially around the tire to reduce the amount of noise generated by contact between said tread elements and a road surface.

* * * * *